United States Patent
Heigl et al.

(10) Patent No.: US 6,802,532 B2
(45) Date of Patent: Oct. 12, 2004

(54) GAS BAG MODULE

(75) Inventors: Jürgen Heigl, Böbingen (DE);
Hans-Joachim Tietze, Heubach (DE);
Jürgen Worsch, Schwabisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/413,665

(22) Filed: Apr. 15, 2003

(65) Prior Publication Data

US 2003/0197357 A1 Oct. 23, 2003

(30) Foreign Application Priority Data

Apr. 22, 2002 (DE) ..................................... 202 06 340 U

(51) Int. Cl.⁷ ............................................. B60R 21/26
(52) U.S. Cl. ..................... 280/736; 280/740; 280/742
(58) Field of Search ................................ 280/736, 740, 280/741, 742

(56) References Cited

U.S. PATENT DOCUMENTS

| | | | | |
|---|---|---|---|---|
| 3,711,115 A | * | 1/1973 | Lohr ........................... | 280/736 |
| 5,356,176 A | * | 10/1994 | Wells .......................... | 280/737 |
| 5,364,127 A | * | 11/1994 | Cuevas ........................ | 280/741 |
| 5,378,015 A | * | 1/1995 | Rink et al. .................. | 280/736 |
| 5,529,333 A | * | 6/1996 | Rizzi et al. ................. | 280/737 |
| 5,785,348 A | * | 7/1998 | Donovan et al. ........... | 280/740 |
| 5,820,162 A | * | 10/1998 | Fink ............................ | 280/742 |
| 6,022,045 A | * | 2/2000 | Faigle ......................... | 280/736 |
| 6,152,484 A | * | 11/2000 | Fischer et al. .............. | 280/736 |
| 6,601,871 B2 | * | 8/2003 | Fischer ....................... | 280/730.2 |
| 6,612,326 B2 | * | 9/2003 | Specht et al. ............... | 137/68.13 |
| 6,669,231 B2 | * | 12/2003 | Ryan ........................... | 280/736 |

FOREIGN PATENT DOCUMENTS

| | | |
|---|---|---|
| DE | 19834690 | 2/2000 |
| DE | 19850448 | 5/2000 |
| DE | 20015065 | 2/2001 |
| DE | 20103892 | 8/2001 |
| EP | 1197400 | 4/2002 |

* cited by examiner

*Primary Examiner*—Paul N. Dickson
*Assistant Examiner*—Toan C To
(74) *Attorney, Agent, or Firm*—Tarolli, Sundheim, Covell & Tummino L.L.P.

(57) ABSTRACT

A gas bag module comprises a gas generator and a rigid housing in which the gas generator is arranged. The housing has at least two gas outflow channels with one port each, the ports adjoining each other and being directed towards the gas generator and separated from each other by a wall. The gas generator has a continuous gas outflow zone with at least two sections, each of the sections of the gas outflow zone being associated with one of the ports. The housing is constructed such that gas emerging from the sections of the gas outflow zone can only flow into the one of the gas outflow channels which is associated with the respective section.

18 Claims, 5 Drawing Sheets

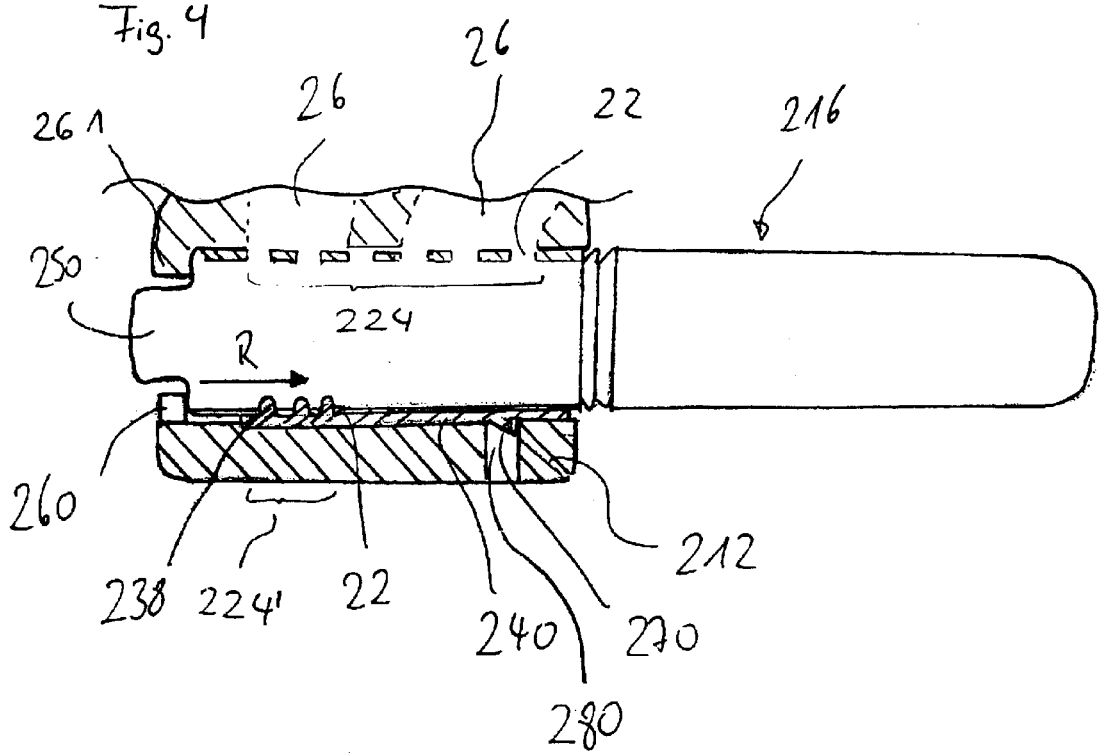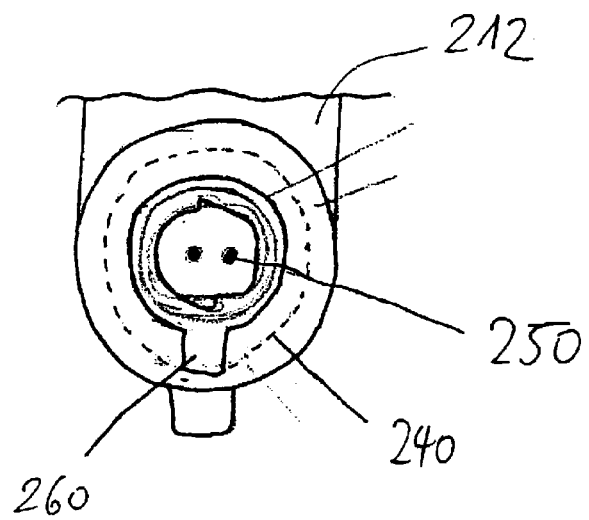

GAS BAG MODULE

TECHNICAL FIELD

The invention relates to a gas bag module.

BACKGROUND OF THE INVENTION

There are known gas bag modules which have a gas generator and a rigid housing in which the gas generator is arranged. The housing may have at least two gas outflow channels for distributing the inflation gas to the chambers of the gas bag.

Gas bags, especially those for protecting vehicle occupants from lateral impact, are being increasingly divided into several chambers. Partly, these chambers are of differing size, but partly also the requirement is set that the chambers are to have differing internal pressures. For this, it is necessary to specifically introduce the gas emerging from the gas generator of the gas bag module into the individual chambers of the gas bag.

It is an object of the invention to ensure such a defined gas distribution.

BRIEF SUMMARY OF THE INVENTION

According to the invention, a gas bag module comprises a gas generator and a rigid housing in which the gas generator is arranged. The housing has at least two gas outflow channels with one port each, the ports adjoining each other and being directed towards the gas generator and separated from each other by a wall. The gas generator has a continuous gas outflow zone with at least two sections, each of the sections of the gas outflow zone being associated with one of the ports. The housing is constructed such that gas emerging from the sections of the gas outflow zone can only flow into the one of the gas outflow channels which is associated with the respective section. In other words, the gas emerging from the gas generator is distributed to gas outflow channels by means of the housing surrounding the gas generator, and directly on the emerging of the gas. These gas outflow channels can then direct the gas into the respective specific chambers of a gas bag, for example. As the gas is directly led off after it has emerged, a high pressure-induced stress of the housing is avoided.

Preferably, the wall which separates the ports from each other lies against the gas generator, in order to separate the two channel ports from each other with respect to flow.

It is particularly favorable if the wall is a rib constructed on the housing. In this case, through the construction of the housing, in particular through the positioning of the rib, a specific gas distribution can be established. For this purpose, it is particularly advantageous if the housing is a one-piece housing made of plastics, preferably an injection-molded part. This construction makes it possible to carry out an adaptation of the gas distribution to various applications, for example for differing gas bags for various types of vehicle, solely through the shape of the housing. Advantageously the same type of gas generator can be used for all the different purposes of application.

The quantity of gas flowing out from the gas generator may also be distributed to the channels in a simple manner in proportions of differing amounts by the channels being constructed and arranged accordingly. For this, the wall which separates the ports of the channels from each other merely has to be positioned in the housing at an appropriate site of the gas outflow zone. As the gas flows directly from the gas generator into the channels, there is no interfering influence on the gas outflow by the emerging gas. Thus, a ratio of the proportions of greater than 60:40 can be achieved in a simple manner.

The connected gas outflow zone may have a plurality of outflow openings, which are constructed for example as rows of holes in the wall of a filter tube of the gas generator. Of course, it is also possible for the gas generator to have several outflow zones, separated from each other spatially and respectively connected for their part. In this case, provision can be made that only one of the outflow zones is active, whilst the other(s) is/are closed, for example by projections which are formed on the housing or on a separate seal and which close the respective outflow openings. Assuming that there are one or more further gas outflow zones separated from the first connected gas outflow zone; then it is possible, of course, that associated with these gas outflow zone(s) are channels which again are separated from each other spatially and with respect to flow by a wall, which channels in turn carry gas away from the gas generator for specific purposes of application. For the invention, it is merely essential that the gas which flows out from the respective section of an outflow zone associated with a channel, can only arrive into this channel.

In an embodiment of the invention, the gas generator is a tubular gas generator, and the gas outflow zone preferably extends only across part of the circumference of the gas generator. With this arrangement, it is particularly simple to place the ports of the channels and the wall lying between them.

The gas bag module is preferably a side gas bag module, in which the gas generator is arranged approximately in the center of the longitudinal extent of the side gas bag, and in which the channels constructed in the housing introduce the gas in chambers of the gas bag without long feed lines.

Further features and advantages of the invention will be apparent from the subclaims as well as the following description of several embodiments.

BRIEF DESCRIPTION OF THE DRAWINGS

FIG. 4 is a diagrammatic view, partially in section, of a gas bag module according to a third embodiment of the invention;

FIG. 5 is a front view of the gas bag module of FIG. 4;

DETAILED DESCRIPTION OF THE PREFERRED EMBODIMENTS

Figure 1:
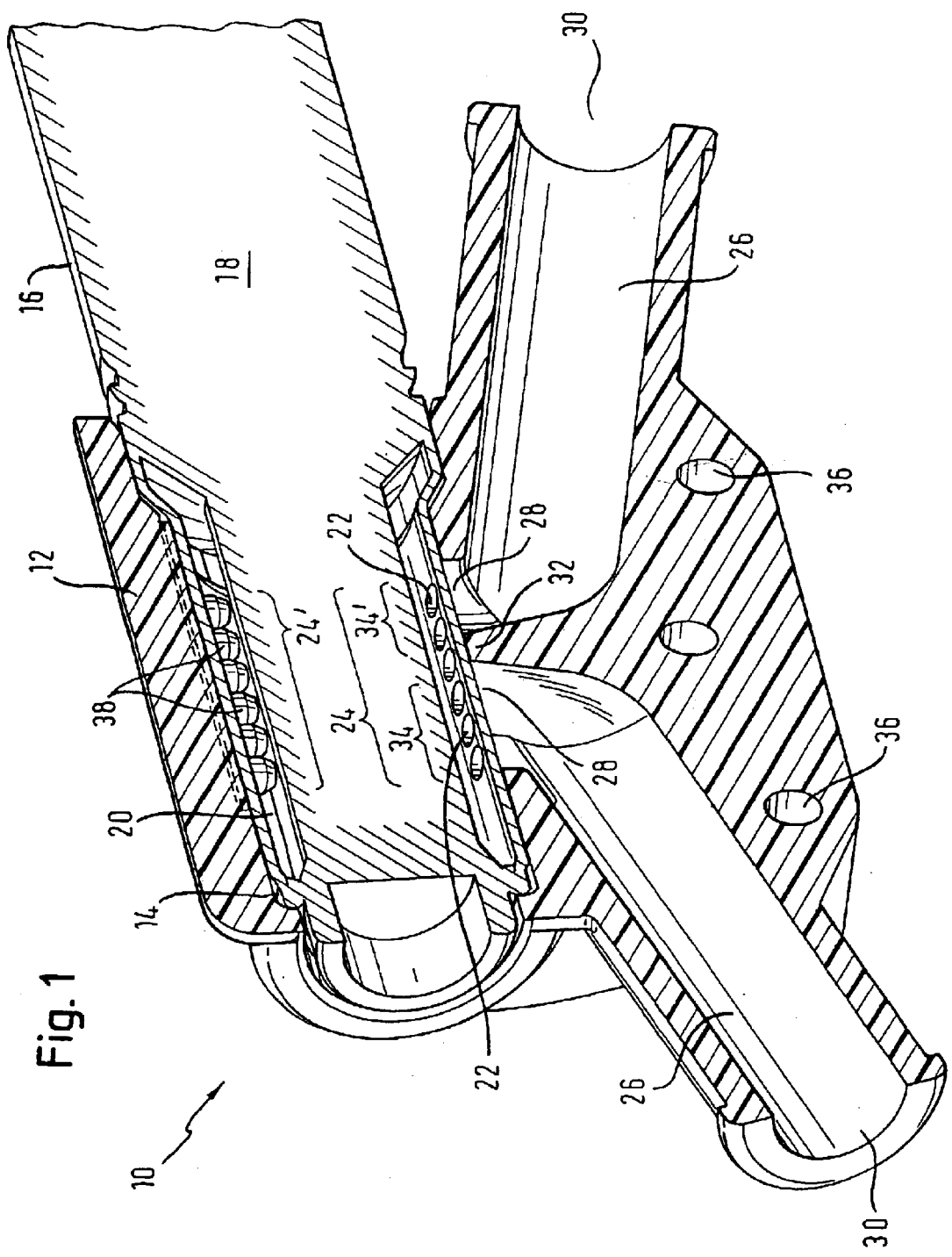
FIG. 1 shows a diagrammatic sectional drawing of a gas bag module according to the invention in a first embodiment.
Figure 2:
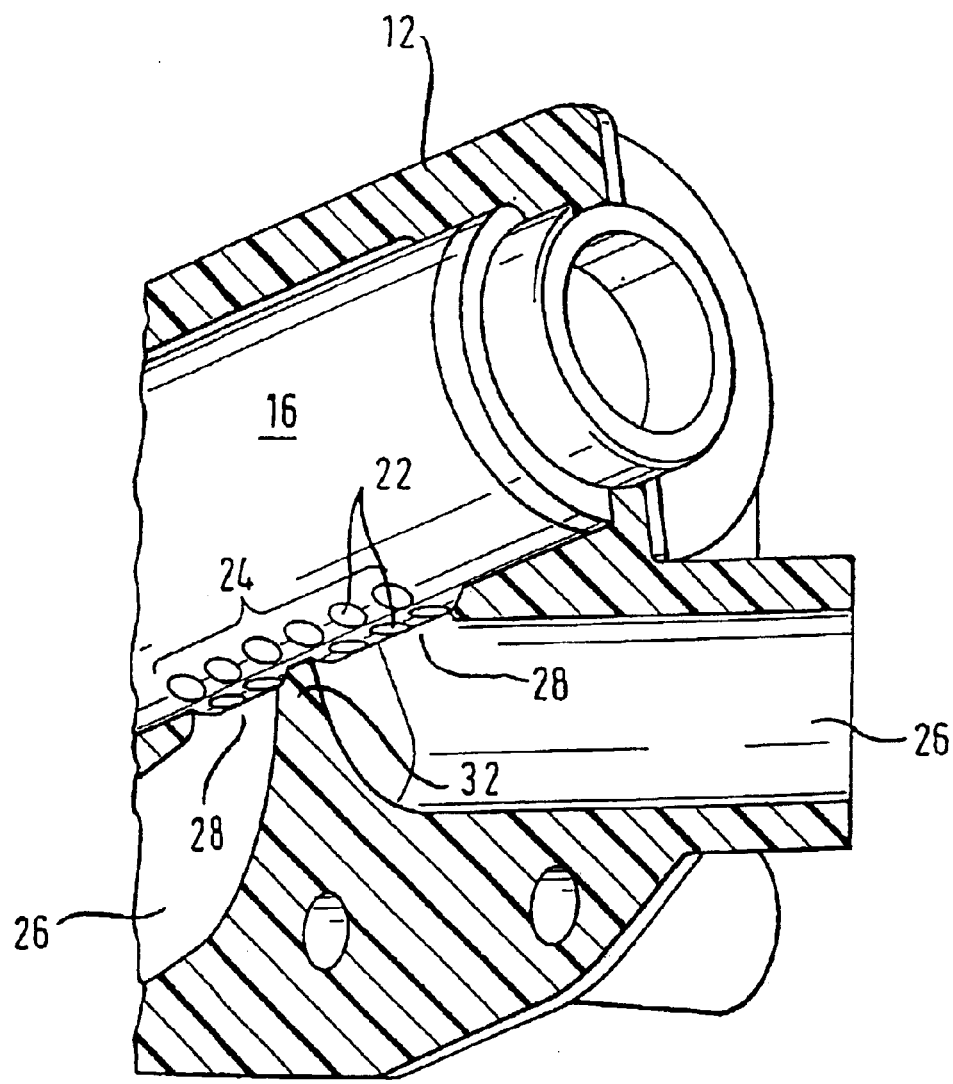
FIG. 2 is a diagrammatic view, partially in section, of the gas bag module of FIG. 1.

In FIG. 1, a gas bag module 10 is illustrated, which can be used for example as a so-called middle module for a side gas bag (window bag). In this case, the gas bag module would be arranged approximately in the middle of the longitudinal extent of the gas bag and could be used, for example, for filling two chambers of the gas bag.

The gas bag module 10 has a rigid housing 12 which is preferably produced in one piece from plastic by injection molding. A mounting 14 for a gas generator 16 is constructed in the housing 12.

The gas generator 16 shown here is a commercially available tubular gas generator with a combustion chamber 18 and a filter chamber 20 surrounding the combustion chamber 18. In the outer wall of the filter chamber 20, outflow openings 22 are provided, through which gas generated in the combustion chamber can leave the gas generator 16. The outflow openings 22 are arranged such that they form a connected gas outflow zone 24.

Provided in the housing 12 are two gas outflow channels 26 which each have a port 28 directed toward the gas generator, and also a port 30 directed for example towards a gas bag. The two ports 28 of the gas outflow channels 26 are separated from each other spatially and with regard to flow by a wall 32 which is constructed as a rib of the housing 12. The wall 32 forms an integral component of the housing.

The channel ports 28 are arranged such that the wall 32 lies against the outer wall of the filter chamber 20 of the gas generator 16. In addition, the housing 12 is constructed such that the sections 34, 34' of the continuous gas outflow zone 24 are associated with one port 28 each. The wall or sections of the housing 12 surrounding the ports 28 seal in as gas-tight a manner as possible with the gas generator 16. This leads to gas, flowing out from the outflow openings 22, which flows out from one of the sections 34, 34', only being able to flow into the gas outflow channel 26 associated with this section 34, 34', or the port 28 thereof. Downstream of the outflow openings 22 of the gas generator 16, the housing 12 is not provided with a gas equalizing chamber. The gas emerging from the outflow openings 22 flows directly into one of the channels 26. In this way, the gas emerging from the gas outflow zone 24 is distributed to the gas outflow channels 26 already immediately on emerging from the gas generator 16. Through the arrangement of the wall 32, the extent of the sections 34 associated with the respective gas outflow channels 26 and, hence, the quantity of gas flowing into the respective gas outflow channels 26, can be set in a finely graduated manner. Also, an unequal distribution of the quantities of gas to the outflow channels 26 can be achieved; in particular, a ratio of outflow quantities of greater than 60:40 can be achieved in a simple manner.

In this way, for example, chambers of a gas bag of unequal size can be inflated in an identical space of time, or chambers of the gas bag can be specifically filled so as to have different internal pressures. Gas can be drawn off equally well for a different purpose.

If, as in the embodiment illustrated here, a row of outflow openings 22 is provided in the gas outflow zone 24, the wall 32 can be arranged such that it completely covers one or more of the outflow openings 22. Thus, the separation of the gas streams with regard to flow can be achieved in a simple manner.

Other components may be also be formed on the housing 12, for example fastening openings 36, via which the gas bag module can be connected with the vehicle.

Preferably, a gas generator 16 is used, which only has one gas outflow zone 24 extending only across part of the circumference of the gas generator 16. However, it is also possible to use a gas generator with several gas outflow zones. In this case, the housing is preferably constructed such that the outflow openings of a gas outflow zone 24' are closed by special formations on the housing 12, for example by projections 38, so that no gas can emerge from the gas outflow zone 24'.

Alternatively, of course a further group of gas outflow channels (not shown here) can be joined to a further gas outflow zone 24', the gas flowing out from sections of the gas outflow zone 24 in turn only being able to flow into the channels associated with the respective sections.

The housing may be formed completely in the injection molding tool, so that a further subsequent processing can be substantially dispensed with. Owing to the possibility of simple adaptation of the housing, the invention is also suitable for the use of gas generators with 25 mm diameter.

Reference numerals which have already been introduced for elements with identical construction or function will be maintained in the following description of further embodiments.

Figure 3:
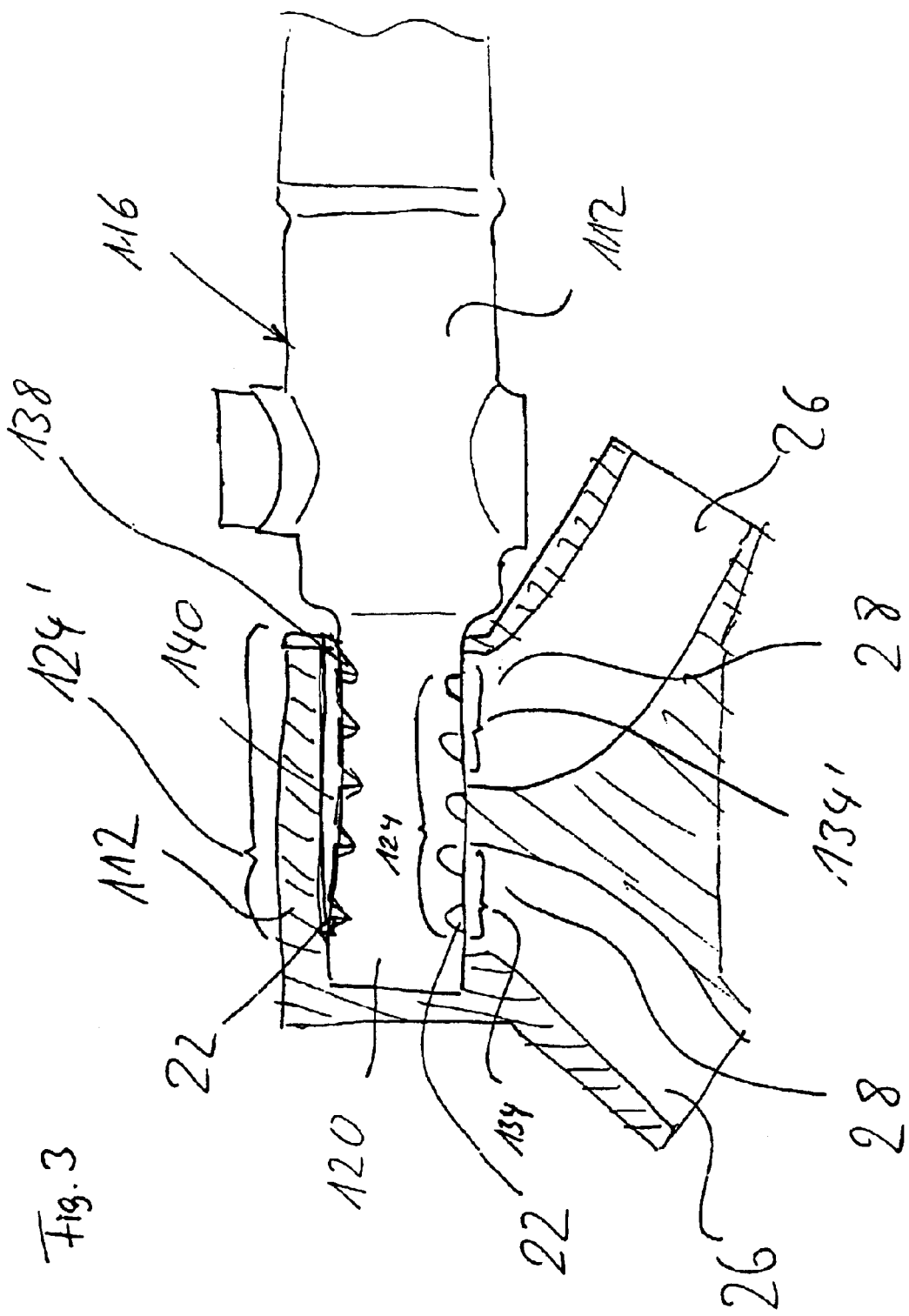
FIG. 3 is a diagrammatic view, partially in section, of a gas bag module according to a second embodiment of the invention.
Figure 6:
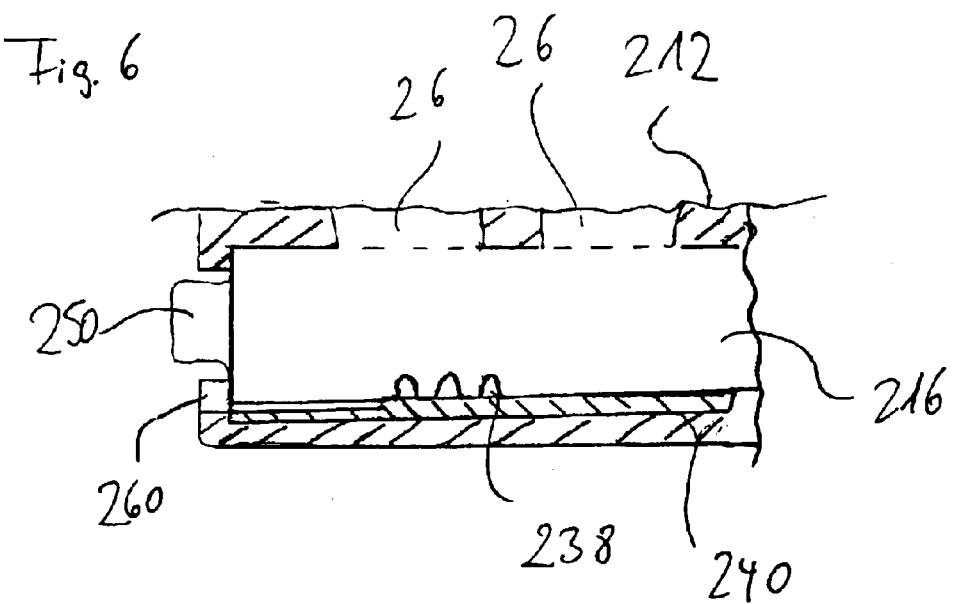
FIG. 6 is a detail view of the gas bag module of FIG. 4.

A gas bag module according to a second embodiment is shown in FIG. 3. Here, the filter chamber 120 of the gas generator 116 is realized as an extended, laterally protruding filter tube with a diameter that is reduced as compared with the remaining housing 112. The diameter of the filter chamber 120 may only be 15 mm, for instance. It is in this way that the radial dimension of the gas bag module can be kept small, in spite of using a housing 112 which surrounds the circumference of the gas generator.

The gas outflow zone 124 which cooperates with the ports 28 of the gas outflow channels 26 can easily be adapted to the respective requirements with respect to its total extent as well as to the dividing in sections 134, 134' associated to the respective channel ports 28.

The outflow openings of one or more additional gas outflow zone(s) 124' not associated with the gas outflow channels 26 are covered here by a seal 140 having protrusions 138; these protrusions cover all or some of the outflow openings 22 of the gas outflow zone 124'.

The embodiment shown in FIGS. 4 to 8 likewise has an elongate tubular gas generator 216 which has an igniter 250 provided on one end face. Provided on the circumference of the gas generator 216, in a region adjoining the igniter 250, are outflow openings 22 which in this example are arranged in two gas outflow zones 224 and 224'.

As seen in the longitudinal direction, the gas generator 216 is partly received in a housing 212. As already explained in the context of the embodiments described above, the outflow openings 22 of the one gas outflow zone 224 are associated with gas outflow channels 26 formed in the housing 212. This portion of the housing 212 is only outlined in FIGS. 4 to 8. With the housing 212 not being attached, the gas generator 216 is neutral with respect to thrust.

At least some of the outflow openings 22 of the second gas outflow zone 224', which is not in flow connection with the channels 26, are closed by protrusions 238 of a seal 240. The seal 240 consists preferably of an elastic material, so that the outflow openings largely are closed in a gas-tight manner.

On the end face of the housing 212 oriented towards the igniter 250 there is provided a vent opening 260 that has a comparatively small cross-section. Part of the gas leak streams, which basically exist, is discharged from the gas outflow zone 224' in a directed gas stream through the vent opening 260 in a controlled manner. Thus, the leakage gas can not cause a thrust effect between the left-hand wall 261 deformed radially inwards and the left-hand adjoining end wall of the gas generator, which would result in a displacement of the gas generator 216 to the right.

The seal 140 likewise hampers the displacement of the gas generator 216 in the housing 212. This is already accomplished, on the one hand, by the clamping action of the seal between the gas generator 216 and the housing 212. A latching protrusion 270, which is oriented towards the side of the housing 212 and protrudes into a corresponding recess 280 in the housing 212, additionally helps to axially fix the gas generator 216.

It is also conceivable to fix the gas generator on the housing by means of a locking pin (not shown).

Figure 7:
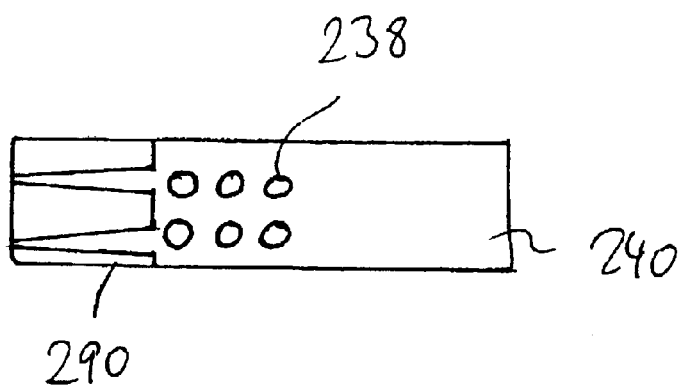
FIG. 7 shows a seal for use in a gas bag module according to FIG. 4.
Figure 8:
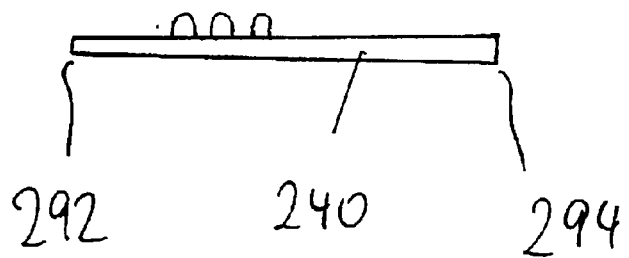
FIG. 8 is a side view of the seal of FIG. 7.

FIG. 7 shows the seal 240 when spread out flat. When installed, the seal 240 has—on the side oriented towards the vent opening 260—a plurality of grooves 290 extending in the longitudinal direction of the gas generator 216, which are formed by a reduction in the thickness of the wall. Through these grooves 290, the leakage gas from the gas outflow zone 224' is guided to the vent opening 260 deliberately. The width of each of the grooves 290 reduces towards the vent opening 260.

The seal 240 is wedge-shaped (FIG. 8) in cross-section; when installed, the thinner end 292 points towards the igniter-side end of the gas generator 216 and towards the vent opening 260. The difference in thickness between the ends 292, 294 of the seal 240 preferably amounts to few tenths of a millimeter.

What is claimed is:

1. A gas bag module comprising a gas generator and a rigid housing in which said gas generator is arranged, said housing having at least two gas outflow channels with one port each, said ports adjoining each other and being directed towards said gas generator and separated from each other by a wall, said gas generator having a continuous gas outflow zone with at least two sections, each of said sections of said gas outflow zone being associated with one of said ports, and said housing being constructed such that gas emerging from said sections of said gas outflow zone can only flow into the one of said gas outflow channels which is associated with the respective section.

2. The gas bag module according to claim 1, wherein said wall lies against said gas generator.

3. The gas bag module according to claim 1, wherein said wall separates said ports from each other spatially and with regard to flow, and wherein said wall is a rib which is formed on said housing.

4. The gas bag module according to claim 1, wherein said housing is a one-piece housing made of plastics.

5. The gas bag module according to claim 4, wherein said housing is an injection-molded part.

6. The gas bag module according to claim 1, wherein said gas outflow channels are constructed and arranged such that portions of a quantity of gas flowing out from said gas generator, which flow into respective ones of said gas outflow channels, are unequal.

7. The gas bag module according to claim 6, wherein a ratio of said portions is greater than 60:40.

8. The gas bag module according to claim 1, wherein said gas generator is a tubular gas generator.

9. The gas bag module according to claim 8, wherein said gas outflow zone extends only across a part of a circumference of said gas generator.

10. The gas bag module according to claim 8, wherein said gas outflow zone is provided on an elongate filter chamber of said gas generator, said filter chamber having a diameter smaller than that of the remaining gas generator.

11. The gas bag module according to claim 1, wherein said housing has a vent opening through which leakage gas flows out in a directed gas stream.

12. The gas bag module according to claim 1, wherein said gas outflow zone has a plurality of outflow openings.

13. The gas bag module according to claim 12, wherein a seal is provided which covers at least one of said outflow openings.

14. The gas bag module according to claim 13, wherein said seal has at least one protrusion which engages in one of said outflow openings.

15. The gas bag module according to claim 13, wherein at least two gas outflow zones are provided, one of which being covered by said seal.

16. The gas bag module according to claim 13, wherein said seal is wedge-shaped as seen in cross-section.

17. The gas bag module according to claim 13, wherein said seal has at least one groove which allows said leakage gas flowing to said vent opening.

18. The gas bag module according to claim 13, wherein said seal has a latching protrusion which is directed towards said housing and engages in a recess of said housing.

* * * * *